(12) United States Patent
Wamprecht et al.

(10) Patent No.: US 6,863,863 B2
(45) Date of Patent: Mar. 8, 2005

(54) COATING COMPOSITION, A PROCESS FOR ITS PREPARATION, AND ITS USE IN THE PRODUCTION OF TEXTURED COATED SURFACES

(75) Inventors: Christian Wamprecht, Neuss (DE); Christian Füssel, Tönisvorst (DE); Beate Baumbach, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/207,462

(22) Filed: Jul. 29, 2002

(65) Prior Publication Data

US 2003/0027922 A1 Feb. 6, 2003

(30) Foreign Application Priority Data

Jul. 31, 2001 (DE) .......................... 101 37 507

(51) Int. Cl.[7] .............................................. B32B 27/36
(52) U.S. Cl. ........................ 420/141; 428/152; 428/155; 428/195; 427/257; 525/124; 525/166; 528/45; 528/272; 528/332
(58) Field of Search ................................ 428/141, 152, 428/155, 195; 525/124, 166; 528/45, 272, 332

(56) References Cited

U.S. PATENT DOCUMENTS

| | | | | |
|---|---|---|---|---|
| 4,088,619 A | * | 5/1978 | Holzrichter | 260/29.4 |
| 5,516,549 A | | 5/1996 | Jasenof et al. | 427/178 |
| 5,688,598 A | * | 11/1997 | Keck et al. | 428/458 |
| 5,759,630 A | * | 6/1998 | Vosskuhl et al. | 427/393.5 |

FOREIGN PATENT DOCUMENTS

| | | |
|---|---|---|
| CA | 2335048 | 10/2000 |
| DE | 4338265 C1 | 12/1994 |

OTHER PUBLICATIONS

Database CA 'Online! Chemical Abstracts Service, Columbus, Ohio, US; Kanai, Hiroshi et al: "Coating compositions for metal plates and their manufacture" retrieved from STN Database accession No. 125:89245 XP002219031 Zusammenfassung & JP 08 100150 A (Shinnippon Seitetsu KK, Japan; Nippon Paint Co Ltd) Apr. 16, 1996.

Database CA 'Online! Chemical Abstracts Service, Columbus, Ohio, US; Fujita, Eiji et al: "Waterborne coating compositions, their manufacture and use on precoated metals" retrieved from STN Database accession No. 130:353702 XP002219028 Zusammenfassung & JP 11 124542 A (Unitika Ltd., Japan) May 11, 1999.

Database CA 'Online! Chemical Abstracts Service, Columbus, Ohio, US; Nakae, Yashuhiko et al: "Themosetting water–thinned base coating compositions with good moisture resistance for automobiles, and their application" retrieved from STN Database accession No. 126:132712 XP002219029 Zusammenfassung & JP 08 311396 A (Nippon Paint Co Ltd, Japan) Nov. 26, 1996.

Database CA 'Online! Chemical Abstracts Service, Columbus, Ohio, US; Ogawa, Hideaki et al: "Aqueous coating compositioins and coating method" retrieved from STN Database accession No. 125:278771 XP002219030 Zusammenfassung & JP 08 209059 A (Nippon Paint Co Ltd, Japan) Aug. 13, 1996.

* cited by examiner

Primary Examiner—Ana Woodward
(74) Attorney, Agent, or Firm—Joseph C. Gil; Thomas W. Roy; Gary F. Matz

(57) ABSTRACT

The present invention relates to a coating composition, a process for its preparation, and to its use for the production of textured coated surfaces on heat-resistant substrates, in which coating composition is based on hydroxyl group-containing binders, cross-linking agents and particular amine compounds.

4 Claims, 1 Drawing Sheet

Figure
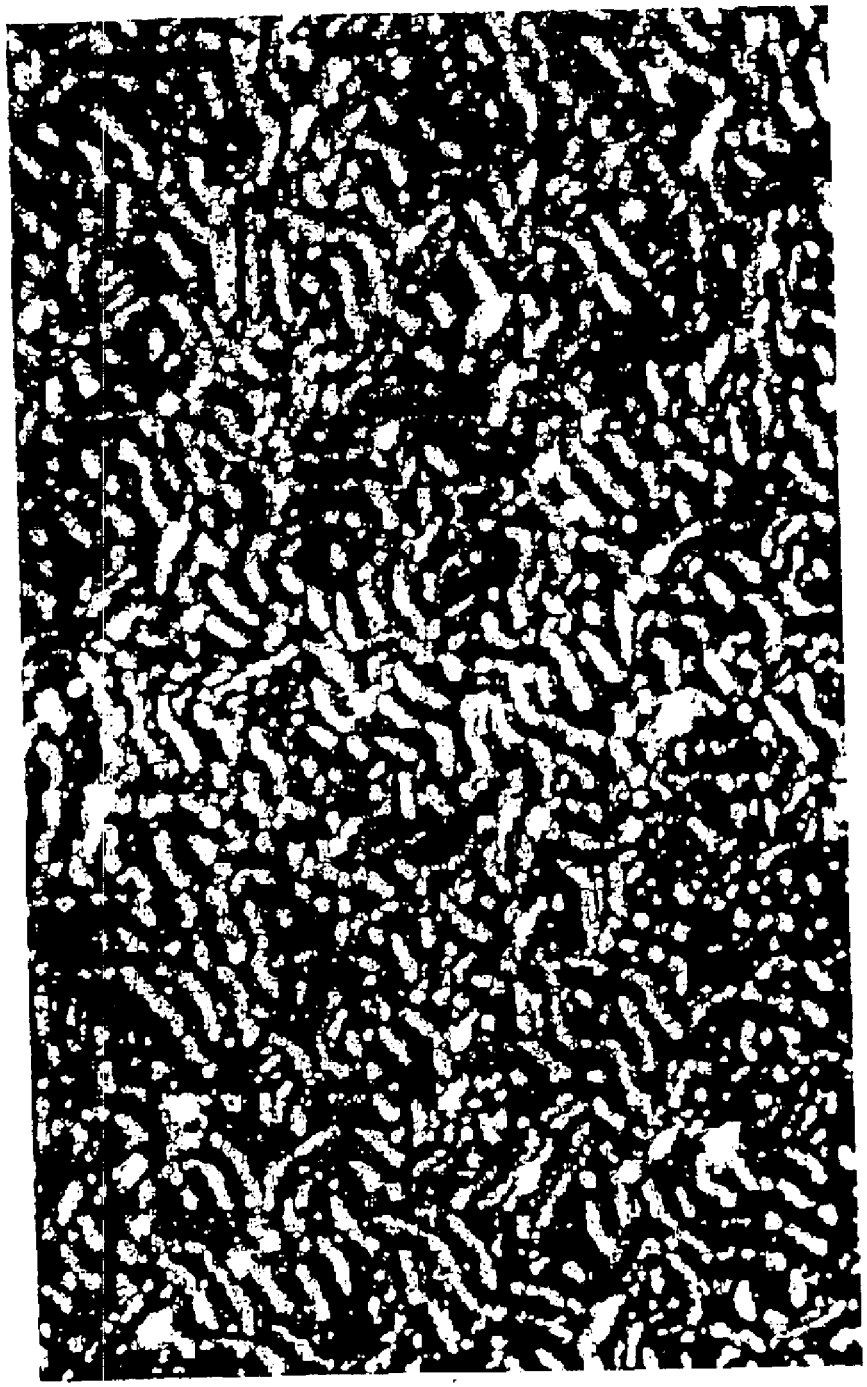

COATING COMPOSITION, A PROCESS FOR ITS PREPARATION, AND ITS USE IN THE PRODUCTION OF TEXTURED COATED SURFACES

FIELD OF THE INVENTION

The present invention relates to a coating composition, a process for its preparation, and its use in the production of textured coated surfaces on heat-resistant substrates, in which coating composition is based on hydroxyl group-containing binders, cross-linking agents and particular amine compounds.

BACKGROUND OF THE INVENTION

Metal and plastics surfaces, for example in the automotive sector, are in many cases coated with texturing and optionally delustering coatings in order to obtain textured surfaces.

On page 51 of Farbe & Lack 7/2000 there are disclosed sample solutions for the formulation of textured coatings based on polyols (e.g. polyester polyols) and cross-linkers (e.g. polyisocyanates) according to the prior art. There are generally used as additives anti-settling agents (e.g. bentone), thixotropic agents and thickeners as well as silicone oils as effect-giving agents. In order to accelerate cross-linking, catalysts (e.g. dibutyltin dilaurate) should be added.

It is also known to use coating compositions which contain organic solvents and are based on hydroxyl group-containing binders and polyisocyanate cross-linkers and which contain pasty additives containing powdered texturing agents and delustering agents to achieve textured surfaces on, for example, plastics parts of motor vehicles, especially for automotive refinish. Ground polypropylene, for example, is used as the texturing agent. Silica, for example, may be used as the delustering agent. With the aid of the delustering agents, the coating composition used to obtain the textured surface is adjusted to the degree of gloss of the plastics surface. In order to ensure good adhesion to the plastics surface, elastifying binders are used. A problem of such systems is that dried particles on the edge of the particular packaging can fall back into the lacquer and, as so-called pinholes, can lead to disruptions in processing and to faults in the lacquer. It is not possible to remove such dried product particles by sieving because the powdered texturing agent would otherwise be removed at the same time.

An improvement of that problem is the process described in DE-A 43 17 784, according to which a powdered texturing binder is mixed with the coating composition immediately prior to application.

DE-A 43 38 265 describes the coating of substrates in strip form by the coil coating process with solvent-borne coating compositions containing highly cross-linked polymer powders, so-called microgels. Special surface effects are achieved by the use of such powders.

An object of the present invention is to provide a coating composition, its preparation and its use in the production of textured lacquer surfaces, in which it is possible to dispense with the incorporation of special texturing powdered additives.

It has been found that this object can be successfully achieved with the coating compositions of the present invention described in greater detail below.

SUMMARY OF THE INVENTION

The present invention relates to coating compositions containing

A) 45 to 97.45 parts by weight of a hydroxyl group-containing polyester,

B) 2.5 to 50 parts by weight of a cross-linker component containing aminoplast resins and/or blocked polyisocyanates, C) 0.05 to 5.0 parts by weight of an organic compound having at least one tertiary amino group, and D) 0 to 20 parts by weight of at least one hydroxyl group-containing compound other than A).

The present invention also relates to a process for the preparation of these coating compositions by mixing together components A) to C) and, optionally D) and known additives.

Finally, the present invention relates to the use of the coating compositions according to the invention for the production of textured coatings on heat-resistant substrates by applying the coating compositions to a heat-resistant substrate and curing the coating by baking at temperatures of 90 to 500° C., preferably 110 to 400° C.

BRIEF DESCRIPTION OF THE DRAWINGS

The FIGURE represents the surface appearance of a coating obtained according to the present invention.

DETAILED DESCRIPTION OF THE INVENTION

The coating compositions according to the invention contain

A) 45 to 97.45, preferably 50 to 97 and more preferably 70 to 96.50 parts by weight of a hydroxyl group-containing polyester, B) 2.5 to 50, preferably 2.95 to 45.5 and more preferably 3.4 to 26 parts by weight of a cross-linker component containing aminoplast resins and/or blocked polyisocyanates, C) 0.05 to 5.0, preferably 0.05 to 4.5 and more preferably 0.1 to 4 parts by weight of an organic compound having at least one tertiary amino group, and D) 0 to 20, preferably 0 to 15 and more preferably 0 to 10 parts by weight of at least one hydroxyl group-containing compound other than A).

The coating compositions according to the invention may also contain 0 to 200 parts by weight, based on the total weight of components A) to D), of the known additives from polyurethane chemistry.

Suitable hydroxy-functional polyesters A) are preferably those having a hydroxyl number of 20 to 240 mg KOH/g, more preferably 25 to 200 mg KOH/g and most preferably 30 to 160 mg KOH/g. The acid number is preferably below 30 mg KOH/g, more preferably below 25 mg KOH/g and most preferably below 20 mg KOH/g. The glass transition temperature of polyester A) is preferably −60 to +100° C., more preferably −50 to +80° C. and most preferably −40 to +70° C. The number average molecular weight of the polyester polyols is preferably 500 to 50,000 g/mol, more preferably 600 to 30,000 g/mol and most preferably 700 to 20,000 g/mol.

Suitable starting materials for preparing the hydroxy-functional polyesters include:

1) (Cyclo)alkane diols (i.e. dihydric alcohols having (cyclo)aliphatically bound hydroxyl groups) having a molecular weight of 62 to 286, such as ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4- cyclohexanediol, 2-ethyl-2-butylpropanediol, diols containing ether groups (such as diethylene glycol, triethylene glycol, tetraethylene glycol, dipropylene glycol, tripropylene glycol and polyethylene, polypropylene or polybutylene glycols having a maximum molecular weight of 2000, preferably 1000 and more preferably 500. Reaction products of the above-mentioned diols with ε-caprolactone can also be used as diols.

2) Tri- and higher-hydric alcohols having a molecular weight of 92 to 254 such as glycerol, trimethylolpropane, pentaerythritol, dipentaerythritol and sorbitol.

3) Monoalcohols such as ethanol, 1- and 2-propanol, 1- and 2-butanol, 1-hexanol, 2-ethylhexanol, cyclohexanol and benzyl alcohol.

4) Dicarboxylic acids and their anhydrides having a molecular weight of 98 to 600 such as phthalic acid, phthalic anhydride, isophthalic acid, terephthalic acid, tetrahydrophthalic acid, tetrahydrophthalic anhydride, hexahydrophthalic acid, hexahydrophthalic anhydride, maleic anhydride, fumaric acid, succinic acid, succinic anhydride, adipic acid, dodecandioic acid and hydrogenated dimer fatty acids.

5) Higher-functional carboxylic acids and their anhydrides such as trimellitic acid and trimellitic anhydride.

6) Monocarboxylic acids such as benzoic acid, cyclohexanecarboxylic acid, 2-ethylhexanoic acid, caproic acid, caprylic acid, capric acid, lauric acid and natural and synthetic fatty acids.

Polyesters A) are prepared in known manner according to methods described in detail in, for example, "Ullmanns Encyclopädie der technischen Chemie", Verlag Chemie Weinheim, 4th edition (1980), Volume 19, pages 61 ff or H. Wagner and H. F. Sarx, "Lackkunstharze", Carl Hanser Verlag, Munich (1971), pages 86 to 152.

The esterification is carried out, optionally in the presence of a catalytic amount of a conventional esterification catalyst (such as acids, bases or transition metal compounds, for example titanium tetrabutoxide or dibutyltin oxide) at esterification temperatures of 80 to 260° C., preferably 120 to 250° C. and more preferably 160 to 240° C. The esterification reaction is carried out until the desired values for the hydroxyl number and the acid number have been reached.

The polyester polyols are dissolved in suitable solvents after the condensation reaction. Suitable solvents include esters such as ethyl acetate, butyl acetate, methoxypropyl acetate, methyl glycol acetate, ethyl glycol acetate and diethylene glycol monomethyl ether acetate; ketones such as methyl ethyl ketone, methyl isobutyl ketone and methyl amyl ketone; and aromatic compounds such as toluene, xylene and the higher boiling hydrocarbon mixtures known in polyurethane chemistry.

Suitable cross-linkers B) include aminoplast resins and/or blocked polyisocyanates. Examples of aminoplast resins include melamine-formaldehyde or urea-formaldehyde condensation products. Suitable melamine resins are known melamine-formaldehyde condensation products that have not been etherified or have been etherified by saturated monoalcohols having from 1 to 4 carbon atoms, such as those described, for example, in FR-PS 943 411 or in D. H. Solomon, The Chemistry of Organic Film Formers, 235–240, John Wiley & Sons Inc., New York, 1967. The melamine resins may, however, be replaced wholly or partially by other cross-linking aminoplast resins, such as those described, for example, in "Methoden der Organischen Chemie" (Houben-Weyl), Vol. 14/2, Part 2, 4th edition, Georg Thieme Verlag, Stuttgart, 1963, 319 ff.

If the lacquers are to be used for weather resistant applications, blocked polyisocyanates based on aromatic polyisocyanates are less suitable. For applications in which no particularly high demands are made regarding the fastness of the coatings to light, blocked polyisocyanates based on aromatic polyisocyanates can be used. Examples include 2,4-diisocyanatotoluene and mixtures thereof with up to 35 wt. %, based on the total mixture, of 2,6-diisocyanatotoluene.

Preferred are blocked polyisocyanates that are based on light-fast aliphatic or cycloaliphatic polyisocyanates such as 1,6-diisocyanatohexane, 1-isocyanato-3,3,5-trimethyl-5-isocyanatomethylcyclohexane (isophorone diisocyanate), 1,3- and 1,4-cyclohexane diisocyanate, tetramethylcyclohexane 1,3- and 1,4-diisocyanate, 4,4'-diisocyanatodicyclohexylmethane, 2,4'-diisocyanatodicyclohexylmethane and mixtures thereof.

Also suitable as cross-linker components are lacquer polyisocyanates containing blocked isocyanate groups and prepared from the preceding isocyanate monomers and containing biuret, allophanate, urethane groups, uretdione, isocyanurate and/or iminooxadiazinedione groups. Polyisocyanates containing such isocyanurate groups are described, for example, in patent specifications DE-A 1090196, EP-A 0 003 505, DE-A 1101 394, U.S. Pat. No. 3,358,010, U.S. Pat. No. 3,903,127, U.S. Pat. No. 4,324,879, U.S. Pat. No. 4,288,586, DE-A 3 100 262, DE-A 3 100 263, DE-A 3 033 860 and DE-A 3 144 672.

To prepare reversibly blocked polyisocyanates B), the base polyisocyanates or mixtures thereof are reacted with blocking agents such as ε-caprolactam, acetone oxime, butanone oxime, cyclohexanone oxime, malonic acid diethyl ester and acetoacetic acid diethyl ester, so that complete blocking of the free isocyanate groups is achieved.

The blocking reaction of the free isocyanate groups with ε-caprolactam or butanone oxime takes place at temperatures of 100 to 130° C., as described, for example, in DE-A 3 004 876. It is also possible to use catalysts, for example organotin compounds, in that reaction in amounts of 0.01 to 0.1 wt. %, based on the total weight.

The blocking reaction with malonic esters or acetoacetic acid esters is carried out in a known manner (see DE-A 2 342 603 or 2 550 156) with the aid of basic catalysts, such as sodium phenolate, sodium methoxide or other alkali alcoholates. Other organic alkali compounds, such as sodium malonate, are also suitable. The catalysts are used in an amount of 0.01% to 2%, based on the total weight of the reaction components. The amount of dialkyl malonate used should be at least 1 mole per isocyanate equivalent. It is, however, advantageous to use the blocking agent in an excess of from 5 to 20%.

A polyisocyanate satisfying the requirements of component B) can be prepared by only partially blocking the isocyanate groups, so that, for example, from 40 to 90% of the isocyanate groups are in blocked form, and then the partially blocked polyisocyanate can be reacted in a polyol of the type suitable as component A). The preparation of combinations A) to C) and, optionally, D) according to the invention can be carried out analogously thereto, not only as described below by mixing of the individual components but also by partially blocking unblocked polyisocyanates or polyisocyanate mixtures, so that, for example, up to 30% of the isocyanate groups are still in free form. The polyester polyols suitable as component A) are then added in an amount such that, after the spontaneous addition reaction between the free isocyanate groups and a portion of the hydroxyl groups of the polyester polyol, a mixture of blocked polyisocyanates and excess polyester polyol A) is present in which the equivalent ratio of blocked isocyanate groups to hydroxyl groups is from 0.6:1 to 2:1, which is fundamental to the invention. In such a case, component B) would contain the reaction product between the partially blocked polyisocyanate and the polyester polyol. The blocking reaction can be carried out without a solvent or in the presence of a solvent that is inert towards isocyanate groups. Such solvents have already been mentioned above.

Suitable amine compounds C) for the coating compositions according to the invention include those containing organic compounds having at least one tertiary amino group and, optionally, other functional groups. Examples include tertiary aliphatic amines such as trimethylamine, triethylamine, tri-n-propylamine, triisopropylamine, diisopropylethylamine, tri-n-butylamine, triisobutylamine, tri-n-pentylamine, triisopentylamine, tri-n-hexylamine, 1,1-dimethoxy-N,N-dimethylmethaneamine, tribenzylamine, tri-n-octylamine, tri-n-decylamine, di-n-decylmethylamine, tris-(2-ethylhexyl)-amine, tri-n-dodecylamine and di-n-dodecylmethylamine; tertiary cycloaliphatic amines such as N,N-dimethylcyclohexylamine, N,N-diethylcyclohexylamine, N,N-dicyclohexylmethylamine and N,N-dicyclohexylethylamine; hydroxy-functional tertiary aliphatic amines such as N,N-dimethylethanolamine, N,N-diethylethanolamine, N,N-di-n-propylethanolamine, N,N-diisopropylethanolamine, N,N-di-n-butylethanolamine and N,N-diisobutylethanolamine; hydroxy-functional tertiary cycloaliphatic amines such as N-cyclohexyl-N-methylethanolamine, N-cyclohexyl-N-ethylethanolamine and N,N-dicyclohexylethanolamine; and compounds in which the tertiary amino group is part of a ring system such as 1-methylpyrrolidine, 1-ethyl pyrrolidine, N-(2-hydroxyethyl)-pyrrolidine, 1-methylpiperidine, 1-ethylpiperidine, N-(2-hydroxyethyl)-piperidine, 1-methyl-4-piperidone, N,N-dimethylpiperazine, 1,4,5,6-tetrahydro-1,2-dimethylpyrimidine, 1,4-diazabicyclo[2,2,2]octane, 2,3,4,6,7,8-hexahydropyrrolo[1,2-a]pyrimidine, 2,3,4,6,7,8,9,10-octahydropyrimidine[1,2-a]azepine, 1,3,5-tris-(2-hydroxyethyl)-hexahydro-1,3,5-triazine, N-methylmorpholine, N-(2-hydroxyethyl)-morpholine, N-(2-hydroxypropyl)-morpholine and 1,2-dimorpholinoethane.

In addition to binder components A) to C), the coating compositions according to the invention may contain the binder component D) and also the known additives from the lacquer industry. Binder component D) includes other organic polyhydroxyl compounds known from polyurethane lacquer technology other than component A). Examples include known polyester, polycarbonate, polyether or, preferably, polyacrylate polyols. Suitable polyacrylate polyols include copolymers, soluble in lacquer solvents of the above-mentioned type, of hydroxy-functional unsaturated monomers (such as hydroxyethyl and/or hydroxypropyl (meth)acrylate) with other olefinically unsaturated monomers (such as methyl methacrylate, styrene, acrylic acid, ethyl acrylate, butyl acrylate, acrylonitrile or mixtures of such monomers). Component D) are in amounts of up to 20 wt. %, based on the total amount of the coating composition according to the invention.

When polyhydroxyl compounds D) are present, the amount of cross-linker component B) must be correspondingly increased within the above-mentioned limits. When blocked polyisocyanates as used as component B) in particular, the amount thereof must be such that the equivalent ratio of blocked isocyanate groups to hydroxyl groups is at least 0.6:1. The use of polyols D) is not preferred.

Suitable additives include known solvents having a boiling point of at least 75° C. or a boiling range above 75° C. The upper limit of the boiling point or boiling range of the solvents is dependent on the particular baking conditions. The higher the baking temperature, the higher should be the boiling temperatures or boiling ranges of the solvents to be used. Suitable solvents include aromatic hydrocarbons such as toluene, xylene, tetralin, cumene and mixtures of aromatic compounds having narrow boiling ranges (for example Solvesso 100, 150 and 200 from Exxon); ketones such as methyl isobutyl ketone, diisobutyl ketone, isophorone and cyclohexanone; esters such as acetic acid n-hexyl ester, ethyl glycol acetate, ethyl acetate, butyl acetate and methoxypropyl acetate; and mixtures of these solvents.

As already mentioned, the solvents may be added during the preparation of polyols A) or D), during the preparation of cross-linker resins B), as solvents or diluents for the tertiary amine component C), or alternatively at any desired later point in time.

Other additives include plasticizers, pigments, fillers, flow aids, light stabilizers, UV absorbers and catalysts that accelerate the cross-linking reaction.

The curing of polyester/aminoplast resin binders is known to be accelerated by the addition of acid. If the acid number of the polyesters is not high enough, acid catalysts can be added to the coating compositions according to the invention. For example, curing is greatly accelerated by the addition of 0.5 wt. % of p-toluenesulfonic acid, based on the weight of components A) and B). It is also possible to add to polyesters having low acid numbers, 1 to 5 wt. %, based on polyester, of an anhydride of a relatively acidic dicarboxylic acid, for example maleic anhydride, in order to increase the acid number and hence lower the baking temperatures, or shorten the baking times, even without the addition of acid catalysts.

When blocked polyisocyanates are used as cross-linker component B), it is possible to add the tin-containing catalysts known from polyurethane chemistry such as dibutyltin dilaurate to accelerate the cross-linking reaction.

The coating compositions according to the invention are mixtures that are liquid and stable to storage at room temperature and can be formulated as described above by the addition of additives to form lacquers that can be processed according to the invention.

To produce textured coatings using the coating compositions according to the invention, the compositions are applied in one or more layers to heat-resistant substrates of any kind by known application methods, for example, by spraying, immersion, pouring or with the aid of rollers or knives.

The coating compositions according to the invention are suitable for the production of both pigmented and clear coatings on metals, heat-resistant plastics, wood, ceramics, mineral substrates or glass. The coating compositions according to the invention are particularly suitable for the production of coatings on aluminium and steel strips, which are coated by the automatic coil coating method and are used as motor vehicle bodies, casings for machines and domestic appliances, coating sheets, vessels or containers. The substrates to be coated can be provided with suitable primers before they are coated.

The coating compositions according to the invention are preferably used in an amount such that dry layer thicknesses of 5 to 50 $\mu$m, more preferably 10 to 45 $\mu$m and most preferably 15 to 40 $\mu$m are obtained. It is, however, also possible to produce thicker layers.

Curing of the coating compositions according to the invention takes place, depending on the application, at a temperature of 90 to 500° C., preferably 110 to 400° C., in a time of 0.25 to 45 minutes, preferably 0.5 to 35 minutes. The cured coatings have a finely textured surface with outstanding coatings properties such as good solvent resistance and high elasticity, with special mention being made of the attractive, finely wrinkled or grained surface texture for decorative coatings.

EXAMPLES

The coating compositions according to the invention and their use in the production of decorative coatings are described in greater detail in the following examples. All percentages are by weight.

Example 1

Preparation of Aromatic Polyester Polyol A1) Having a Low OH Number 1392 g of neopentyl glycol, 588 g of 1,6-hexanediol, 85 g of trimethylolpropane, 674 g of phthalic anhydride and 0.45 g of Fascat 4100[1] catalyst were weighed into a 5 liter stirrer vessel equipped with a stirrer, a distillation bridge having a column, and a nitrogen inlet pipe, and heated to 125° C. During the heating phase, the vessel volume of nitrogen/h was passed through. At 125° C., 1857 g of isophthalic acid and 294 g of adipic acid were added. The nitrogen stream was increased to twice the vessel volume/h, and heating was carried out to 220° C. with the head temperature being limited to max. 105° C. The water of reaction was largely separated off, a base temperature of 220° C. being achieved towards the end. Condensation was carried out at 220° C. until an acid number of ≦3 mg KOH/g was obtained. Approximately 4500 g of a polycondensation product having an acid number of 2.8 mg KOH/g and an OH number of 38 mg KOH/g were obtained. 1800 g of Solvesso 100[2] solvent were added to 2700 g of the resin with stirring. A solution was obtained having a solids content of 60.4 wt. % and a viscosity of 1644 mPas, measured at 23° C. in a rotary viscometer from Haake (Rotovisko RV 20).

[1] Elf Atochem Deutschland GmbH, Düsseldorf
[2] Deutsche Exxon, Cologne

Example 2

Preparation of Aromatic Polyester Polyol A2) Having a Medium OH Number 88 g of 1,2-propanediol, 1720 g of neopentyl glycol, 427 g of trimethylolpropane, 989 g of adipic acid and 1939 g of isophthalic acid were reacted under the conditions according to Example 1, but without a catalyst and at 210° C. Approximately 4500 g of a polycondensation resin having an acid number of 1.8 mg KOH/g and an OH number of 82 mg KOH/g were obtained. 1575 g of a solvent mixture of 9 parts Solvesso 100[2] solvent and 1 part isobutanol were added to 2925 g of the resin with stirring. A solution was obtained having a solids content of 65.2 wt. % and a viscosity of 2850 mPas, measured at 23° C. in a rotary viscometer from Haake (Rotovisko RV 20).

Example 3

Preparation of Polyester Polyol A3) Free of Aromatics, Having a Medium OH Number 103 g of 1,2-propanediol, 2167 g of neopentyl glycol, 273 g of trimethylolpropane, 1152 g of adipic acid and 1334 g of maleic anhydride were reacted under the conditions according to Example 1, but without a catalyst and at 180° C. Condensation was carried out until the acid number was from 5 to 7 mg KOH/g. Approximately 4500 g of a polycondensation resin having an acid number of 5.9 mg KOH/g and an OH number of 91 mg KOH/g were obtained. 1000 g of Solvesso 100[2] solvent were added to 3000 g of the resin with stirring. A solution was obtained having a solids content of 75.3 wt. % and a viscosity of 3970 mPas, measured at 23° C. in a rotary viscometer from Haake (Rotovisko RV 20).

Use Examples

Application Examples

In the use (Application) examples below, coil coating compositions pigmented according to conventional methods of coating technology were prepared and applied under conventional coil coating conditions to test sheets and cured. In addition to the coating properties conventional for this application, such as solvent resistance, flexibility and film hardness, the surface structure of the coatings in particular was evaluated. An impression of how the desired surface structure appeared is shown in FIG. 1, which is the image of a photograph of a correspondingly coated test sheet.

Example 4

White Coil Coating Based on Polyester A1)

A grinding stock was prepared according to the following bead mill formulation:
9.77 parts by weight polyester A1)
0.20 part by weight Cymel 303[3] cross-linker
0.03 part by weight N,N-dimethylcyclohexylamine
2.51 parts by weight methoxypropyl acetate
5.01 parts by weight Solvesso 200 S[2] solvent
28.27 parts by weight Tronox R-KB-4[4] titanium dioxide The grinding stock was dispersed for approximately 30 minutes in a bead mill with Siliquartz beads of 2 mm diameter. The grinding stock was then separated from the glass beads by sieving. The following coating components were added with stirring (coating formulation):
31.71 parts by weight polyester A1)
3.60 parts by weight Cymel 303[3] cross-linker
0.09 part by weight N,N-dimethylcyclohexylamine
0.30 part by weight Catalyst 1786 B[5], 50% in Solvesso 200 S[2] solvent
1.42 parts by weight Acronal 4F[6] additive, 50% in Solvesso 200 S[2] solvent 17.09 parts by weight Solvesso 200 S[2] solvent 100.00 parts by weight (bead mill formulation+coating formulation)

The resulting coating composition was adjusted to a processing viscosity of approximately 70 s (DIN 4 mm beaker at 23° C.) with further Solvesso 200 S solvent.

Application of the Prepared White Coating Composition:

The lacquer was applied by means of a knife to a chromated aluminium sheet having a thickness of 1 mm. Immediately after application, the coated sheet was baked in an Aalborg oven on a rotary plate. Baking conditions –40 s at an oven temperature of 350° C., the mean object temperature was 232° C. The resulting dry layer thickness was approximately 25 μm.

The coated sheet had a pronounced, finely wrinkled or finely grained surface structure. The lacquer was resistant to the action of solvents.

[2] Deutsche Exxon, Cologne
[3] Dyno-Cytec, Neuss
[4] Kerr McGee, Krefeld
[5] Nordmann&Rassmann GmbH, Hamburg
[6] BASF AG, Ludwigshafen

Example 5

Reddish-Brown Coil Coating Based on Polyester A1)

Analogously to Example 4, the following lacquer constituents were used and processed to a reddish-brown lacquer:
Bead Mill Formulation:
4.67 parts by weight polyester A1)
0.09 part by weight Cymel 303[3] cross-linker
0.01 part by weight N,N-dimethylcyclohexylamine
3.35 parts by weight Bayferrox 3920[7] pigment
3.35 parts by weight Bayferrox 110 M[7] pigment
2.20 parts by weight Kronostitan 2160[8] pigment
0.58 part by weight Aerosil R 972[9] additive
3.44 parts by weight Solvesso 200 S[2] solvent
Coating Formulation:
60.39 parts by weight polyester A1)
8.41 parts by weight Cymel 303[3] cross-linker
0.17 part by weight N,N-dimethylcyclohexylamine
0.50 part by weight Catalyst 1786 B[5], 50% in Solvesso 200 S[2] solvent
0.94 part by weight Acronal 4F[6] additive, 50% in Solvesso 200 S[2] solvent 11.90 parts by weight Solvesso 200 S[2] solvent 100.00 parts by weight (bead mill formulation+coating formulation)

The resulting reddish-brown lacquer was applied and cured under the same conditions as in Example 4. A reddish-brown coating was obtained having a finely wrinkled or grained surface, which was resistant to the action of solvents.

[7] Bayer AG, Leverkusen
[8] Kronos International Inc., Leverkusen
[9] Degussa-Hüls AG, Hanau

Example 6

White Coil Coating Based on Polyester A2)

Analogously to Example 4, the following lacquer constituents were used and processed to a white lacquer:
Bead Mill Formulation:
10.00 parts by weight polyester A2)
28.27 parts by weight Tronox R-KB-4[3] titanium dioxide
2.52 parts by weight methoxypropyl acetate
5.01 parts by weight Solvesso 200 S[2] solvent
Coating Formulation:
29.10 parts by weight polyester A2)
2.93 parts by weight Cymel 303[3] cross-linker
0.13 part by weight N,N-dimethylcyclohexylamine
0.30 part by weight Catalyst 1786 B[5], 50% in Solvesso 200 S[2] solvent
1.42 parts by weight Acronal 4F[6] additive, 50% in Solvesso 200 S[2] solvent 20.32 parts by weight Solvesso 200 S[2] solvent/ 100.00 parts by weight (bead mill formulation+coating formulation)

The resulting white lacquer was applied and cured under the same conditions as in Example 4. A white coating was obtained having a finely wrinkled or grained surface, which was resistant to the action of solvents.

Example 7

White Coil Coating Lacquer Based on Polyester A3)

Analogously to Example 4, the following lacquer constituents were used and processed to a white lacquer:
Bead Mill Formulation:
10.00 parts by weight polyester A3)
28.27 parts by weight Tronox R-KB-4[4] titanium dioxide
2.52 parts by weight methoxypropyl acetate
5.01 parts by weight Solvesso 200 S[2] solvent
Coating Formulation:
29.30 parts by weight polyester A3)
2.93 parts by weight Cymel 303[3] cross-linker
0.13 part by weight N,N-dimethylcyclohexylamine
0.30 part by weight Catalyst 1786 B[5], 50% in Solvesso 200 S[2] solvent
1.42 parts by weight Acronal 4F[6] additive, 50% in Solvesso 200 S[2] solvent 25.52 parts by weight Solvesso 200 S[2] solvent/ 100.00 parts by weight (bead mill formulation+coating formulation)

The resulting white lacquer was applied and cured under the same conditions as in Example 4. A white coating was obtained having a finely wrinkled or grained surface, which was resistant to the action of solvents.

Examples 8 to 10

White Coil Coatings Based on Polyester A1)

Coatings analogous to Example 4 were prepared, but with different catalysts. Instead of Catalyst 1786 B[5], equal amounts (solid on solid) of the following catalysts were used:

p-toluenesulfonic acid, 10%
Nacure X 49–110[10], 25%
Cycat 4040[3], 40%

[10] Worlee-Chemie, Lauenburg

After application and drying of the coatings according to the conditions of Example 4, white coatings were obtained in Examples 8 to 10 having finely wrinkled or grained surfaces, which were resistant to the action of solvents.

Examples 11 to 15

Reddish-Brown Coil Coatings Based on Polyester A1)

Coatings analogous to Example 5 were prepared, but the following amines were used in the indicated amounts (solid on solid) instead of N,N-dimethylcyclohexylamine:

0.11 part by weight N,N-dimethylaminoethanol
0.14 part by weight N,N-diethylaminoethanol
0.13 part by weight diethanolamine
0.14 part by weight N-methyldiethanolamine
0.11 part by weight N,N-dimethylamino-2-methyl-1-propanol After application and drying of the coatings according to the conditions of Example 4, reddish-brown coatings were obtained in Examples 11 to 15 having finely wrinkled or grained surfaces, which were resistant to the action of solvents.

Comparative Tests 16 to 19

White and reddish-brown coil coatings were prepared analogous to Examples 4 to 7, but without the use of N,N-dimethylcyclohexylamine After application and drying of the coatings according to the conditions of Example 4, highly glossy, white and reddish-brown coatings were obtained in Examples 16 to 19, but without surface texture, which were resistant to the action of solvents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
   A) 45 to 97.45 parts by weight based on the weight of A) to D) of a hydroxyl group-containing polyester having an acid number of <3 mg KOH/g,
   B) 2.5 to 50 parts by weight based on the weight of A) to D) of a cross-linker component containing aminoplast resins and/or blocked polyisocyanates,
   C) 0.05 to 5.0 parts by weight based on the weight of A) to D) of an organic compound having at least one tertiary amino group, and
   D) 0 to 20 parts by weight based on the weight of A) to D) of at least one hydroxyl group-containing compound other than A); wherein cured coatings from the coating composition have a finely textured surface.

2. A process for the preparation of the coating composition of claim 1 which comprises mixing together components A) to C) and optionally D).

3. A process for the preparation of a textured coating on a heat-resistant substrate which comprises applying the coating composition of claim 1 to a heat-resistant substrate and baking the coating at a temperature of 100 to 500° C.

4. A textured coated heat-resistant substrate prepared from the coating composition of claim 1.

* * * * *